UNITED STATES PATENT OFFICE.

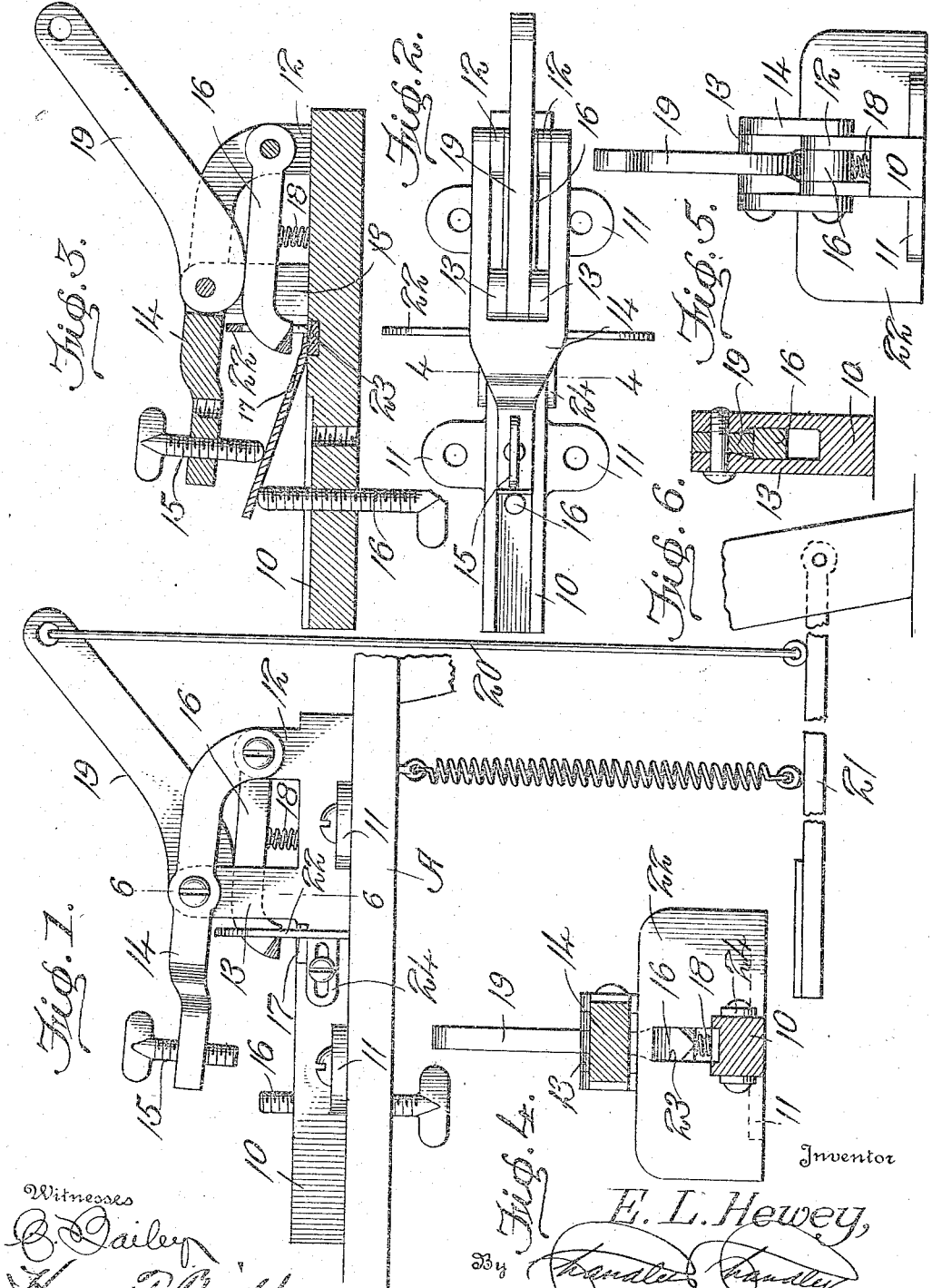

EVERETT L. HEWEY, OF EAST DIXFIELD, MAINE.

SAW-SET.

1,226,514.

Specification of Letters Patent.

Patented May 15, 1917.

Application filed May 25, 1916. Serial No. 99,813.

*To all whom it may concern:*

Be it known that I, EVERETT L. HEWEY, a citizen of the United States, residing at East Dixfield, in the county of Oxford, State of Maine, have invented certain new and useful Improvements in Saw-Sets; and I do hereby declare the following to be a full, clear, and exact description of the invention, such as will enable others skilled in art to which it appertains to make and use the same.

This invention relates to saw sets.

The object of the invention is to provide a saw set embodying an improved construction whereby a more uniform set of the teeth is had than in cases where the setting is accomplished by hand operation or through the medium of the blows of a hammer.

With the above and other objects in view the invention consists in the details of construction and in the arrangement and combination of parts to be hereinafter more fully described and particularly pointed out in the appended claims.

In describing the invention in detail reference will be had to the accompanying drawing wherein like characters of reference denote corresponding parts in the several views, and in which—

Figure 1 is a side elevation of the saw set and its support;

Fig. 2, a plan view of the saw set detached;

Fig. 3, a longitudinal section of the saw set;

Fig. 4, a section on the line 4—4 of Fig. 2;

Fig. 5, an end view of the saw set, and

Fig. 6, a section on the line 6—6 of Fig. 1.

Referring to the drawing the improved saw set is shown as comprising a base 10 having lateral securing ears 11 whereby the saw set may be mounted on a suitable support A. Rising from one end of the base 10 are ears 12, while ears 13 rise from the base 10 intermediate the ends of the latter. The invention further embodies a gage arm 14 one end of which is bifurcated and has its furcations disposed in embracing relation and secured to the ears 12 and 13. Mounted in this arm is a gage screw 15 while another gage screw 16 is mounted in the base 10. Pivoted between the ears 12 and movable between the ears 13 is a setting arm 16 the free end of which is suitably shaped to effect the necessary setting of the saw teeth. Embedded in the base 10 directly beneath the free end of the arm 16 is a plate 17 of hardened steel and forming an anvil upon which the free end of the arm 16 is adapted to operate. The arm 16 is normally held in inactive position by means of a spring 18 interposed between same and the base 10. Pivoted between the ears 13 is a cam lever 19 which coöperates with the upper edge of the arm 16 and has its free end connected by a link 20 to a foot treadle 21 mounted on the support A. Disposed upon the base 10 is a gage plate 22. This plate is provided with a recess 23 and embraces the base 10. The plate is adapted to be adjusted toward and away from the ears 13 and will determine the length of the set as is obvious. This plate 22 is adapted to be supported by adjustable brackets 24 mounted on either side of the base 10.

In operation the saw is placed between the screws 15 and 16 and the latter are adjusted for the proper set. When the tooth to be set is properly positioned over the plate 17 the treadle 21 is depressed. This operation will pivot the lever 19 and the latter will coact with the arm 16 to force the free end of the latter downwardly and effect the setting of the tooth. This operation is repeated until the setting of all the teeth is complete.

What is claimed is:—

1. A saw set comprising a base, a gage arm secured to the base and having one end bifurcated, a gage screw threaded in the gage arm, a gage screw threaded in the base, a setting arm pivoted on the base, and a cam lever pivoted to the base and coöperating with the setting arm and movable between the furcations of the gage arm.

2. A saw set comprising a base, upstanding ears secured to one end of the base, upstanding ears secured to the base intermediate its ends, a gage arm having a bifurcated end the furcations of which embrace and are secured to said ears, a gage screw threaded in the gage arm, a gage screw threaded in the base, a setting arm pivoted between the first ears and movable between the second ears, and a cam lever between the second ears and coöperating with the setting arm.

In testimony whereof, I affix my signature, in the presence of two witnesses.

EVERETT L. HEWEY.

Witnesses:
C. N. BLANCHARD,
J. W. PERKINS.

Copies of this patent may be obtained for five cents each, by addressing the "Commissioner of Patents, Washington, D. C."